United States Patent [19]

Fujishige et al.

[11] Patent Number: 5,112,965

[45] Date of Patent: * May 12, 1992

[54] THICKNER COMPOSITION AND A METHOD FOR THE PREPARATION THEREOF

[75] Inventors: Shoei Fujishige; Rikio Numajiri, both of Ibaraki; Hideyuki Aragane, Tokyo, all of Japan

[73] Assignees: Director-General of the Agency of Industrial Science and Technology; Kashima Oil Co., Ltd., both of Tokyo, Japan

[*] Notice: The portion of the term of this patent subsequent to Dec. 18, 2003 has been disclaimed.

[21] Appl. No.: 282,950

[22] Filed: Dec. 5, 1988

Related U.S. Application Data

[63] Continuation of Ser. No. 161,332, Feb. 18, 1988, abandoned, which is a continuation of Ser. No. 20,146, Feb. 25, 1987, abandoned, which is a continuation of Ser. No. 718,286, Apr. 1, 1985, abandoned.

[51] Int. Cl.$^5$ ............................................. C08B 37/00
[52] U.S. Cl. ................................... 536/114; 106/205; 106/208
[58] Field of Search .................. 536/114; 106/205, 208

[56] References Cited

U.S. PATENT DOCUMENTS

| | | | |
|---|---|---|---|
| 3,912,715 | 10/1975 | Jarowenko | 536/114 |
| 4,041,234 | 8/1977 | Maske | 536/114 |
| 4,098,615 | 7/1978 | Cummisford et al. | 536/114 |
| 4,098,859 | 7/1978 | Cummisford et al. | 536/114 |
| 4,246,037 | 1/1981 | Cottrell | 106/205 |
| 4,326,053 | 4/1982 | Kang et al. | 106/205 |
| 4,363,669 | 12/1982 | Cottrell et al. | 536/114 |
| 4,515,700 | 5/1985 | Hitzman | 536/114 |
| 4,640,358 | 2/1987 | Sampath | 106/208 |
| 4,654,086 | 3/1987 | Baird et al. | 106/208 |

*Primary Examiner*—Ronald W. Griffin
*Attorney, Agent, or Firm*—Hopgood, Calimafde, Kalil, Blaustein & Judlowe

[57] ABSTRACT

The invention provides an aqueous thickener composition useful in the process of enhanced oil recovery in petroleum technology. The thickener composition is prepared by the reaction of a xanthan gum or a similar high molecular weight polysaccharide with a low molecular weight aliphatic aldehyde such as formaldehyde in an aqueous medium in the presence of an inorganic salt such as sodium chloride in a concentration of 0.5 to 10% by weight so that an intramolecular crosslinked fine structure of superhelix is formed in the polysaccharide molecules and the aqueous solution of thus chemically modified polysaccharide is imparted with remarkably improved thermal stability as compared to the aqueous solutions of a similar polysaccharide which has been treated under the same conditions but in the absence of any inorganic salt in the reaction medium.

9 Claims, 1 Drawing Sheet

THICKNER COMPOSITION AND A METHOD FOR THE PREPARATION THEREOF

This is a continuation of application Ser. No. 07/161,332, filed Feb. 18, 1988, now abandoned, which is a continuation of application Ser. No. 07/020,146, filed Feb. 25, 1987, now abandoned, which is a continuation of application Ser. No. 06/718,286, filed Apr. 1, 1985, now abandoned.

BACKGROUND OF THE INVENTION

The present invention relates to a novel thickener composition and a method for the preparation thereof. More particularly, the present invention relates to a thickener composition which is an aqueous solution containing a high molecular weight polysaccharide derivative having remarkably improved thermal stability dissolved therein as well as a method for the preparation of such an aqueous thickener composition by the reaction of a high molecular weight polysaccharide having a specific superhelix structure with a low molecular weight aliphatic aldehyde in an aqueous medium in the presence of an inorganic salt.

Along with the trend of exhaustion of the petroleum resources in recent years, development of the technology is now under way of extensive studies for the secondary and tertiary recovery of petroleum.

One of the typical processes within such a technology is a method for the enhanced recovery of petroleum generally called the "enhanced oil recovery" while the efficiency of this process largely depends on the viscosity of the polymeric thickener composition used therein.

Generally, the polymeric thickener composition used in the process of enhanced oil recovery should have several characteristic properties including, for example, a high viscosity of an aqueous solution thereof even in a relatively low concentration, stability against high shearing forces, insusceptibility to the influences of the variations in the pH value or presence of polyvalent metallic ions, non-Newtonian flow behavior of the solution, durability under a high-temperature and the like.

Recently, several polymeric materials are proposed as one suitable for use as the principal ingredient in such a thickener composition including high molecular weight polysaccharides biologically synthesized by certain microorganisms or so-called biopolymers such as xanthan gum, PS-7 and the like. These biopolymers are not quite satisfactory in respect of the insufficient thermal stability at elevated temperatures for practical use.

For example, the viscosity of an aqueous solution of xanthan gum at 60° C. is only about one tenth of the value at 20° C. This is mainly due to the fact that the elongated fine superhelix structure as the characteristic secondary structure of the polysaccharide at room temperature is denatured when the temperature is risen over about 60° C. so that the desired effect for thickening can no longer be exhibited at higher temperatures. Moreover, the viscocities of aqueous solutions of these high molecular weight polysaccharides vary remarkably at a pH of about 7 as a result of a reversible denaturation-renaturation of the fine structure of the polysaccharide due to the possible dissociation of the electrolyte groups bonded to each of the structural units.

SUMMARY OF THE INVENTION

Thus, an object of this invention is to provide a novel and improved thickener composition free from the above described problems and disadvantages in the prior art thickener compositions and capable of exhibiting a high viscosity with excellent thermal stability even at an elevated temperature for a long period of time.

Another object of the invention is accordingly to provide a method for the preparation of the above mentioned improved thickener composition.

Thus, the thickener composition provided as a result of the extensive investigations undertaken by the inventors with the above mentioned objects comprises:

(a) water as a solvent and a diluent; and (b) a xanthan gum or a thermally stable high molecular weight polysaccharide with a characteristic fine structure similar to that of a xanthan gum having an intramolecular cross-linked stable fine structure formed by the reaction with a low molecular aliphatic aldehyde in the presence of an inorganic salt and dissolved in water as the component (a).

Further, the method of the invention for the preparation of the above defined aqueous thickener composition comprises reacting a high molecular weight polysaccharide such as a xanthan gum with a low molecular weight aliphatic aldehyde in an aqueous medium in the presence of an inorganic salt dissolved therein in a concentration in the range from 0.5 to 10% by weight to form intramolecular crosslinkings which provide a stabilized superhelix fine structure of the high molecular weight polysaccharide.

DETAILED DESCRIPTION OF THE PREFERRED EMBODIMENTS

Figure 1:
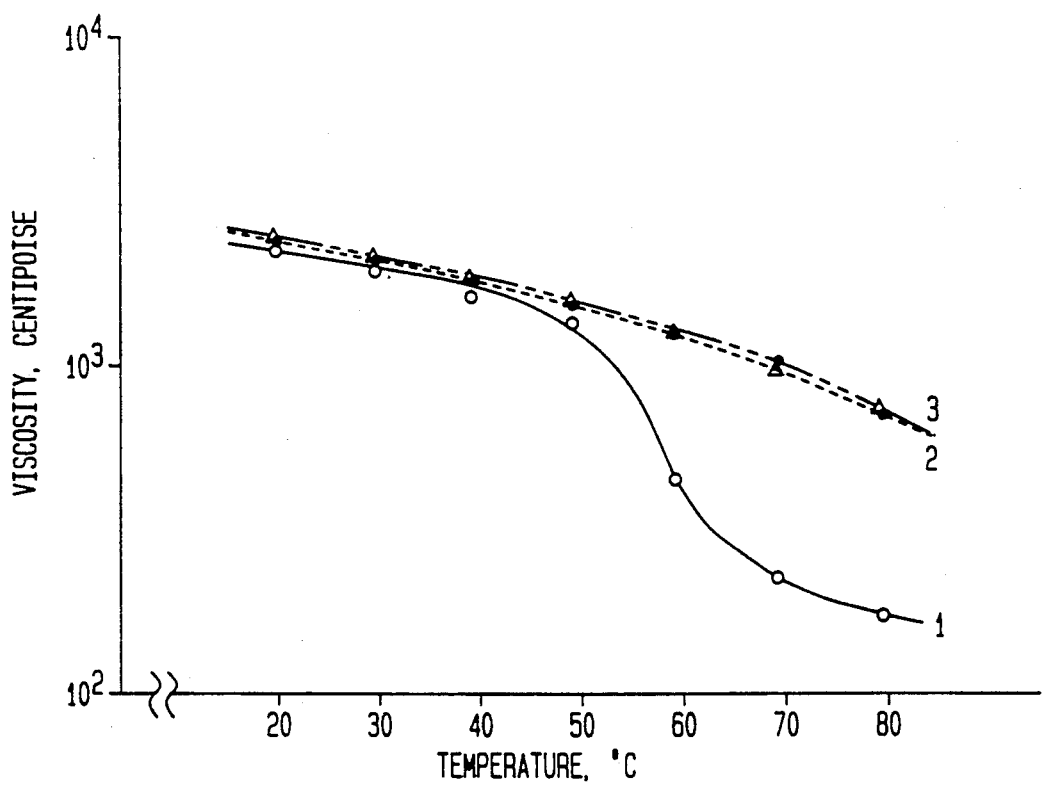
FIGS. 1 and 2 each graphically compare the temperature dependence of the viscosities of aqueous solutions of the polysaccharides prepared in EXAMPLE 1 and EXAMPLE 2, respectively, to that of authentic one at a velocity gradient of 1.92 sec$^{-1}$.

The most typical as the starting material of the high molecular weight polysaccharides used in the method invented herein is a xanthan gum which is a microbiological product from glucose as the substrate by the enzymatic activity of the exobacterial enzyme of the bacteria belonging to the genus of Xantomonas. Alternatively, the starting material may be an anionic polymer electrolyte such as PS-7, PS-10, PS-20 and the like synthesized by the soil bacteria such as *Azotobacter indicum* which have a fine structure similar to that of the xanthan gum.

The chemical to be reacted with the above mentioned polysaccharides in the preparation of the inventive thickener composition is a low molecular weight aliphatic aldehyde which may be, for example, formaldehyde, paraformaldehyde, glutaraldehyde, glyoxal or the like. These aldehydes may be used either singly or as a mixture of two kinds or more according to need. Particularly preferable among the above named low molecular weight aliphatic aldehydes are formaldehyde and paraformaldehyde.

The reaction between the above described polysaccharide and the low molecular weight aliphatic aldehyde in the method invented herein is conducted in an aqueous medium in the presence of an inorganic salt dissolved therein. The inorganic salt is not particularly limitative although chlorides and sulfates are preferred including, for example, the chlorides such as sodium chloride, potassium chloride, calcium chloride, magnesium chloride and the like and sulfates such as sodium sulfate, potassium sulfate, magnesium sulfate and the like. These inorganic salts may be used either singly or as a combination of two kinds or more according to need. Sodium chloride is the most preferable among the above named inorganic salts.

When the aqueous medium for the reaction of the polysaccharide and the low molecular weight aliphatic aldehyde contains these inorganic salts dissolved therein, the dissociation of the anionic groups in the polysaccharide molecules is highly suppressed to facilitate the intramolecular cross-link formation on the fine superhelix structure of the polysaccharide by the reaction thereof with the low molecular weight aliphatic aldehyde which contributes to the stabilization of the secondary fine structure, as a superhelix, even at elevated temperatures above 60° C.

The concentration of the inorganic salt in the aqueous reaction medium used in the method invented herein should be in the range from 0.5 to 10% by weight. When the concentration is lower than 0.5% by weight, the desired effect as mentioned above is insufficient for the improvement of the thermal stability of the polysaccharide. When the concentration exceeds 10% by weight, on the other hand, no additional effect can be obtained thereby.

Following is a description of the preferable conditions in the method invented herein for the preparation of the thickener composition. In the first place, the polysaccharide is dissolved in water in a concentration of 200 to 30,000 p.p.m. or, preferably, 3,000 to 5,000 p.p.m. by weight and then the inorganic salt such as sodium chloride is dissolved in the aqueous solution in a concentration in the range from 0.5 to 10% by weight followed by the adjustment of pH to a value in the range from 4 to 6 by use of an acid such as hydrochloric acid. Thus, the aqueous solution is admixed with 2 to 10 moles of the low molecular weight aliphatic aldehyde per mole of the basic structural units in the polysaccharide under agitation at a temperature in the range from room temperature to 60° C. When the pH value of the solution after completion of this treatment is too low, an alkali such as sodium hydroxide and ammonia is used for the neutralization up to a pH of approximately 7. If necessary, the solution may be further diluted to have the desired viscosity to be used for the enhanced oil recovery directly.

The aqueous solution obtained by the above described treatment has an excellent thermal stability as compared to that of conventional authentic ones. For example, the Curve 1 of FIG. 1 graphically illustrates the temperature dependence of the viscosity of an aqueous solution containing 5,000 p.p.m. of a xanthan gum with the admixture of formaldehyde in the absence of any inorganic salt at a velocity gradient of 1.92 sec$^{-1}$ while the Curve 2 of the same figure illustrates the temperature dependence of the viscosity of an aqueous solution containing 5,000 p.p.m. of a xanthan gu thus prepared by the reaction with formaldehyde in the presence of 1% by weight of sodium chloride. As is clear from a comparison of these two curves, the viscosity (Curve 1) changes non-linearly as a function of temperature, having a sharp decrease starting at about 50° C. while the viscosity (Curve 2) decreases linearly with temperature even at higher temperatures up to 80° C. or above showing a greatly improved thermal stability of the solution.

The solvent in the thickener composition invented herein is usually water but it is optional to use a mixture of water and a water-miscible organic solvent such as alcohols, ketones, dimethylformamide and the like as the solvent.

The thickener composition invented herein is characterized by its capability to keep a high viscosity even at high temperatures. In addition, the thickener composition has an excellent stability against high shearing forces and insusceptibility to the pH and/or to the presence of polyvalent metallic ions in the solution. Therefore, the thickener composition thus prepared is useful, for example, in the process of the enhanced oil recovery.

The present invention is described in more detail by way of examples as follows.

EXAMPLE 1

An aqueous master solution containing xanthan gum in a concentration of 10,000 p.p.m. was prepared by diluting a broth-like material of Kojin broth (Kojin, Ltd., Japan) which is a kind of xanthan gum of about 3.5% by weight active polymer concentration under vigorous agitation using a high speed mixer. Five solutions were prepared by diluting the master solution without or with the admixture of sodium chloride followed by the adjustment of the pH to 4 or 6 using a 2-N hydrochloric acid to give a final concentration of 5,000 p.p.m. by weight for the xanthan gum and concentrations of 0.5, 1.0, 4.0 and 10% by weight for sodium chloride, when added. Each of the thus prepared solutions was divided into four portions, three of which were further admixed with formaldehyde in the amounts of 2, 5 and 10 moles per mole of the repeating structural units of the xanthan gum, and agitated for 12 hours at room temperature or for 30 minutes at 50° C. to effect the reaction between the xanthan gum and formaldehyde. After completion of the reaction, each of the reaction mixture having a pH of 4 was neutralized to a pH of 7 by the dropwise addition of a 1% by weight aqueous solution of sodium hydroxide.

Each of the thus prepared aqueous solutions containing the xanthan gum was subjected to the determination of the velocity-gradient dependence of the viscosity by use of a rotational viscometer at temperatures from 20° C. to 80° C. with 10° C. intervals. The thermal stability of the solutions was evaluated by converting the thus obtained results to the temperature dependence of the viscosity at a velocity gradient of 1.92 sec$^{-1}$.

The result of this study indicated that the viscosity of each of the solutions in the absence of sodium chloride showed steep decrease with temperature at about 50° C. while the viscosity of each of the solutions prepared in the presence of sodium chloride according to this invention decreased linearly as a function of temperature. FIG. 1 illustrates the results obtained in several typical experiments, in which the curves show the temperature dependence of the viscosity of the solutions at a velocity gradient of 1.92 sec$^{-1}$. Curves 1, 2 and 3 were each obtained by the addition of 2 moles of formaldehyde per mole of the repeating structural units of the xanthan gum without (Curve 1) or in the presence of 1% by weight (Curve 2) and 4% by weight (Curve 3) of sodium chloride according to the above described procedure.

EXAMPLE 2

An aqueous master solution containing xanthan gum in a concentration of 10,000 p.p.m. was prepared by dissolving Kalzan, which is a kind of a powdery xanthan gum, in water by agitating using a high speed mixer. Similarly to EXAMPLE 1, solutions were prepared by diluting the master solution without or with admixture of sodium chloride followed by the adjustment of the pH to 4 or 6 using a 2-N hydrochloric acid to give a final concentration of 5,000 p.p.m. by weight for the xanthan gum and concentrations of 0.5, 1.0, 4.0 and 10% by weight for the sodium chloride, when added. Each of the thus prepared solutions was divided into four portions, three of which were further admixed with formaldehyde in amounts of 2, 5 and 10 moles per mole of the repeating structural units of the xanthan gum, and agitated for 12 hours at room temperature or for 30 minutes at 50° C. to effect the reaction between the xanthan gum and formaldehyde. After completion of the reaction, each of the reaction mixtures having a pH of 4 was neutralized to a pH of 7 by the dropwise addition of a 1% by weight aqueous solution of sodium hydroxide.

Each of the thus prepared aqueous solutions containing the xanthan gum was subjected in the same manner as in EXAMPLE 1 to the determination of the velocity gradient dependence of the viscosity in the temperature range from 20° to 80° C. and the results were converted to the temperature dependence of the viscosity at a velocity gradient of $1.92\ \text{sec}^{-1}$ to evaluate the thermal stability of the solutions.

Figure 2:
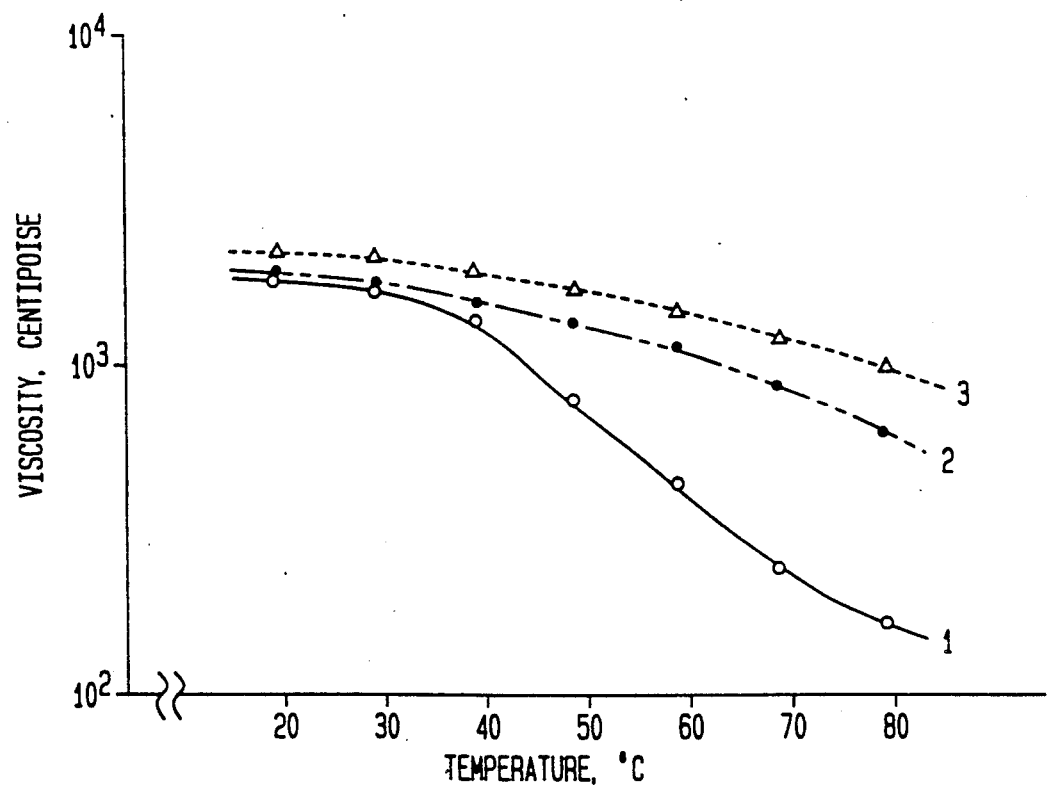

The result of this study indicated, similarly to EXAMPLE 1, that the viscosity of each of the solutions prepared in the absence of sodium chloride decreased sharply as the temperature increased over about 50° C. while the viscosity of each of the solutions prepared in the presence of sodium chloride decreased slightly as a function of temperature. FIG. 2 graphically illustrates the results obtained in several typical experiments, in which the curves show the temperature dependence of the viscosity of the solutions at a velocity gradient of $1.92\ \text{sec}^{-1}$. Curves 1, 2 and 3 were each obtained by the addition of 2 moles of formaldehyde per mole of the repeating structural units of the xanthan gum without (Curve 1) or in the presence of 1% by weight (Curve 2) and 4% by weight (Curve 3) of sodium chloride and treated for 30 minutes at 50° C. according to the above described procedure.

What is claimed is:

1. A thickener composition which comprises:
   (a) water as a solvent; and
   (b) a thermally stable high molecular weight polysaccharide reacted with low molecular weight aliphatic aldehyde in water in the presence of an inorganic salt at a neutral or acidic pH.

2. A thickener composition as claimed in claim 1 wherein the concentration of thermally stable high molecular weight polysaccharide reacted with low molecular weight aliphatic aldehyde in water in the presence of an inorganic salt at a neutral or acidic pH is in the range of from 0.01 to 3% by weight.

3. A thickener composition as claimed in claim 1 wherein the low molecular weight aliphatic aldehyde is formaldehyde.

4. A thickener composition as claimed in claim 1 wherein the high molecular weight polysaccharide is xanthan gum.

5. A method for the preparation of a thickener composition which comprises reacting high molecular weight polysaccharide with low molecular weight aliphatic aldehyde in an aqueous medium in the presence of an inorganic salt at a neutral or acidic pH.

6. A method for the preparation of a thickener composition as claimed in claim 5 wherein the low molecular weight aliphatic aldehyde is formaldehyde or glyoxal.

7. A method for the preparation of a thickener composition as claimed in claim 5 wherein the inorganic salt is sodium chloride.

8. A method for the preparation of a thickener composition as claimed in claim 5 wherein the high molecular weight polysaccharide is xanthan gum.

9. A method for the preparation of a thickener composition as claimed in claim 5 wherein the concentration of thermally stable high molecular weight polysaccharide reacted with low molecular weight aliphatic aldehyde in water in the presence of an inorganic salt at a neutral or acidic pH is in the range of from 0.01 to 3% by weight.

* * * * *